United States Patent [19]

King et al.

[11] 4,409,797
[45] Oct. 18, 1983

[54] CONDENSER COIL AND FAN MOUNT FOR A TRANSPORT REFRIGERATION UNIT

[75] Inventors: Donald D. King, Chanhassen; John E. Rudd, Bloomington, both of Minn.

[73] Assignee: Thermo King Corporation, Minneapolis, Minn.

[21] Appl. No.: 387,053

[22] Filed: Jun. 10, 1982

[51] Int. Cl.³ .............................................. B60H 3/04
[52] U.S. Cl. ..................................... 62/239; 62/263; 62/448
[58] Field of Search .................... 62/239, 263, 448

[56] References Cited

U.S. PATENT DOCUMENTS

| Re. 21,298 | 12/1939 | Nelson | 62/263 |
| 2,175,946 | 10/1939 | Smith | 62/263 |
| 2,526,243 | 10/1950 | Lange | |
| 3,154,888 | 4/1967 | Lynd | 62/241 |
| 3,163,995 | 1/1965 | Maier | 62/241 |
| 3,209,550 | 10/1965 | Charron et al. | 62/243 |
| 3,308,634 | 3/1967 | Smith | 62/263 |
| 3,831,395 | 8/1974 | Leng | 62/263 |
| 3,885,398 | 5/1975 | Dawkins | 62/89 |
| 3,943,728 | 3/1976 | Maudlin | 62/507 |
| 3,984,224 | 10/1976 | Dawkins | 62/89 |

Primary Examiner—Lloyd L. King
Attorney, Agent, or Firm—E. C. Arenz

[57] ABSTRACT

For a container refrigeration unit of the type having an inverted U-shaped coil 50, a coil and fan mounting arrangement is provided in which a plate 68 is secured at its opposite ends to the ends of the legs of the coil, and a fan motor 54 mounting bracket 78 has its opposite ends secured to the plate 68 and carries the motor 54 with the fan 56, all of the components forming a unitary assembly adapted to be secured through the fasteners 94 to the back wall 49 of the condenser section pocket of the refrigeration unit. The plate 68 also functions to block the flow of air from below into the central passage 52.

5 Claims, 4 Drawing Figures

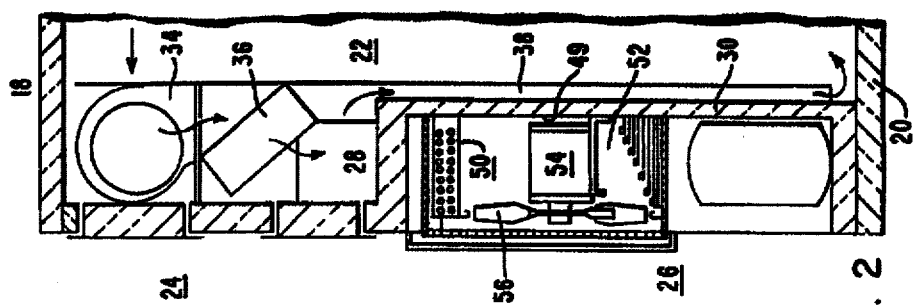
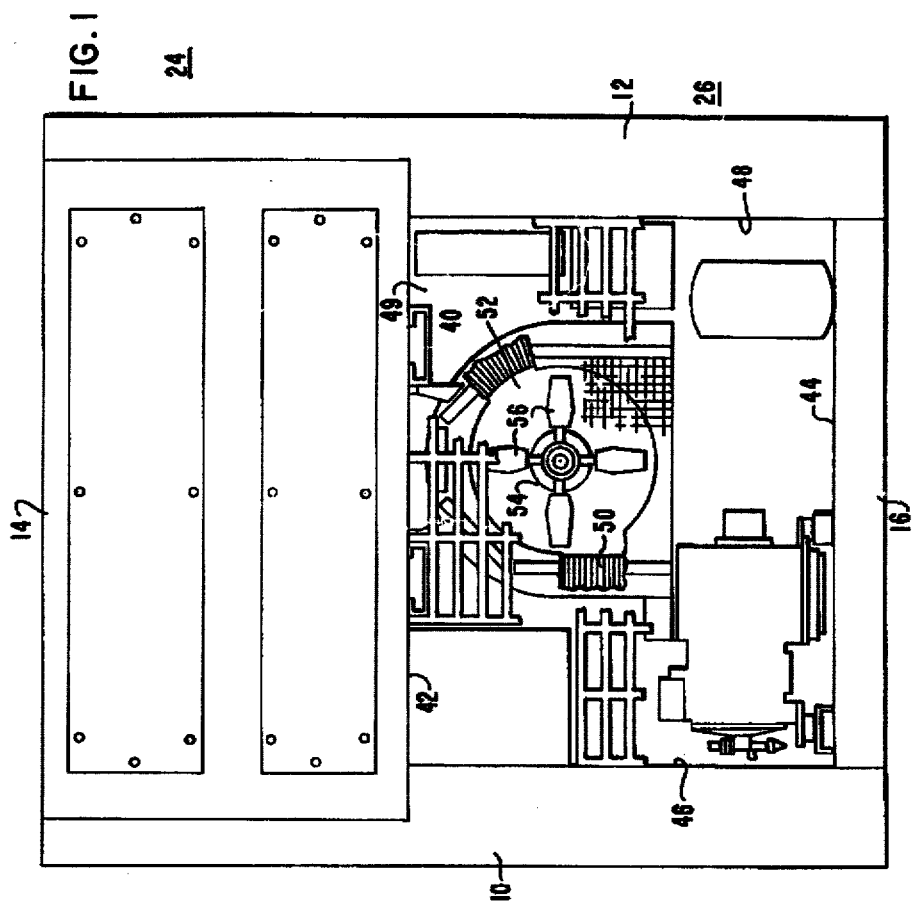

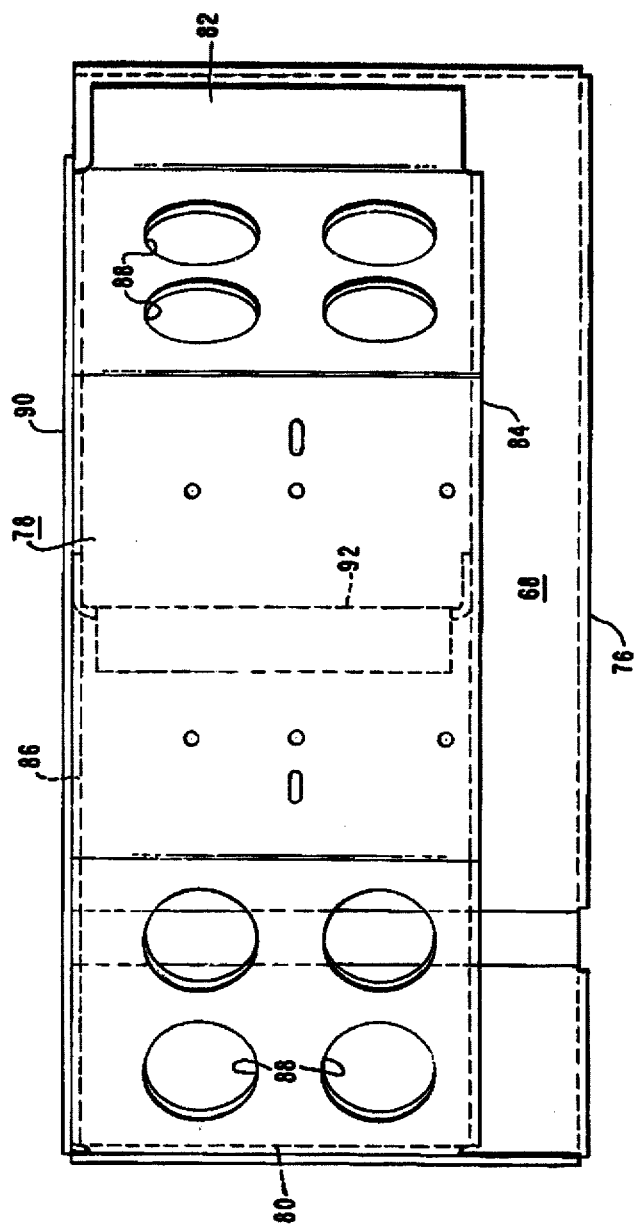

CONDENSER COIL AND FAN MOUNT FOR A TRANSPORT REFRIGERATION UNIT

CROSS-REFERENCE TO RELATED APPLICATION

U.S. patent application Ser. No. 337,060, filed Jan. 5, 1982, is a related patent application in the sense that the arrangement of this invention is particularly adapted for use in the transport refrigeration unit described in that application.

BACKGROUND OF THE INVENTION

This invention pertains to the art of transport refrigeration units of the container type, and particularly to a condenser coil and fan mounting arrangement particularly suited to a refrigeration unit of the type adapted to receive a U-shaped condenser coil in an inverted disposition.

The advantages of such a general arrangement are set forth in connection with the noted related application. Thus, this invention relates to a particular mounting arrangement through the provision of a unitary assembly which includes the coil, an air blockoff plate, a motor mounting bracket, and the motor and fan so that all of these elements may be brought together in a sub-assembly fashion, and then the sub-assembly mounted to the transport refrigeration unit as a whole in a single operation and with a relatively few fasteners required. This is considered to be advantageous from a manufacturing standpoint.

SUMMARY OF THE INVENTION

The arrangement according to the invention includes a multi-row condenser coil with each row being separate from the adjacent row and formed into an inverted U-shaped configuration with structural header means at both of the opposite ends of the legs of the coil. Plate means extend sideways between the header means and is secured to the header means to maintain the coil in the U-shape. A motor bracket is rigidly secured on the plate means to form one assembly therewith, the one assembly being secured to the back wall of the section or pocket in which the coil is to be situated, the coil, motor fan, plate means and bracket means comprising a unitary assembly adapted to be installed as such, and with the plate means being of a front to rear depth to prevent the flow of air from below up into the central condenser space.

DRAWING DESCRIPTION

FIG. 1 is a partly broken face view of a container refrigeration unit of the general type to which the invention is applicable;

FIG. 2 is a generally schematic outline view in the nature of a vertical section of the unit of FIG. 1;

FIG. 4 is a top plan view of the motor bracket and generally horizontally extending plate means.

DESCRIPTION OF THE PREFERRED EMBODIMENT

Figure 3:
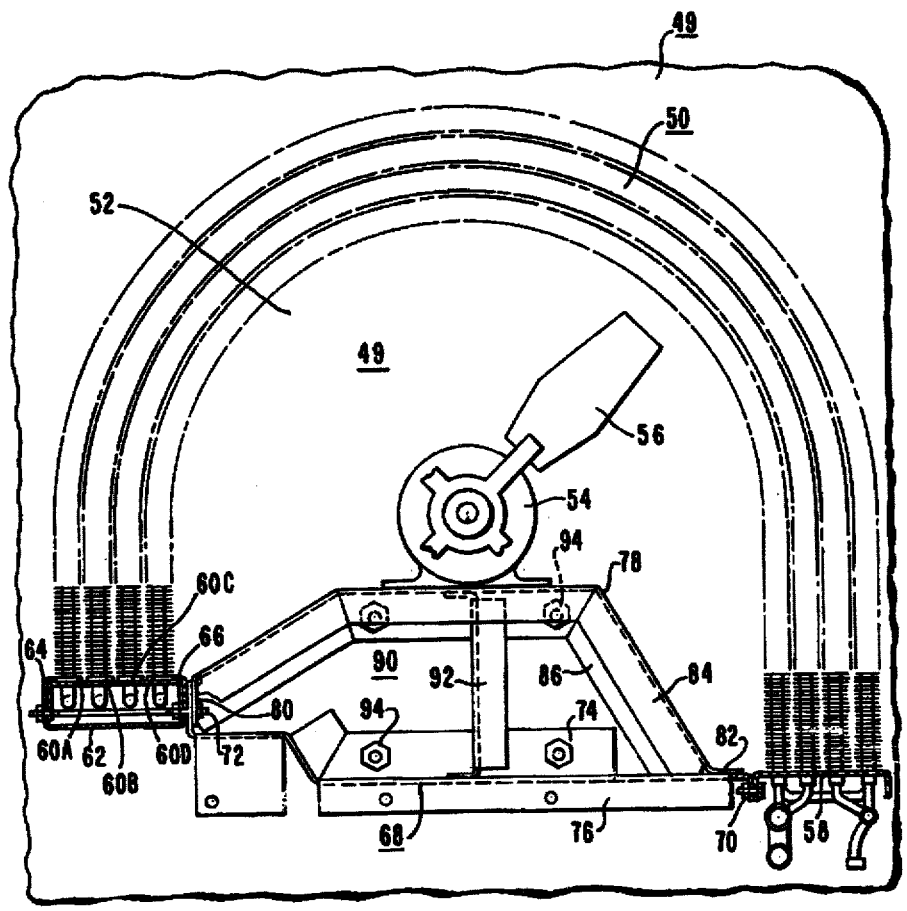
FIG. 3 is a front elevation view of the unitary assembly according to the invention.

The container refrigeration unit of FIGS. 1 and 2 is shown and described herein for the purpose of explaining the basic construction of a unit in which the invention finds particular applicability. The unit has a front face provided with opposite side flanges 10 and 12, and top and bottom flanges 14 and 16 which abut the margins defining a front opening in a container unit having top and bottom walls 18 and 20 (FIG. 2), with the refrigeration unit being operated to serve the space 22 inside the container.

The refrigeration unit has two main sections, the upper evaporator section generally designated 24 and the lower condenser section generally designated 26. These sections are thermally insulated from each other as by the horizontal thermal wall 28 between the top of the condenser section and the bottom of the evaporator section, and the vertical thermal wall 30 at the rear wall of the condenser section.

In the particular arrangement illustrated in FIG. 2, the air flow relative to the container is as indicated by the arrows with the air being drawn from the container by the evaporator fan means 34, discharged downwardly through the evaporator 36, the flow then passing down through a narrow passage 38 behind the condenser section, as well as along both of the opposite sides of the condenser section through passages which are not shown in the Figures. The air is then discharged from the bottom of the unit back into the container.

The condenser section is basically in the form of a forwardly open pocket generally designated 40. This forwardly open pocket is defined by the top wall 42, bottom wall 44, the opposite walls 46 and 48, and rear wall 49. A U-shaped condenser coil generally designated 50 is situated in this pocket in an inverted disposition, that is, with the bight of the U being at the top. In the central space 52 inside the coil, a condenser fan motor 54 carrying a condenser fan 56 is located. The general arrangement described thus far is the same as that disclosed in the noted related patent application. The invention with which this application is concerned is the mounting arrangement for the refrigerant coil, fan motor and fan and will now be described in connection with FIGS. 3 and 4.

The coil 50 illustrated in FIG. 3 comprises a four-row coil, with each row being separate from the adjacent row and being individually finned. A structural header 58 common to all of the rows captures the rows at the end of one of the legs of the coil. At the opposite end of the coil each row has an individual header element, indicated in FIG. 3 as being header elements 60A, B, C, and D. The coil is bent in a conventional fashion into the U-shape as shown in FIG. 3, and upon the completion thereof a channel-shaped multi-row header 62 provided with opposing inwardly directed flanges 64 and 66 is slid onto the end of the coil to capture the individual row headers 60A–D in the relation as shown in FIG. 3.

A coil so formed has a tendency to spring outwardly or in effect to open up the U. Generally horizontally extending plate means generally identified by the numeral 68 extends between the opposite ends of the coil and is fastened as by fasteners 70 and 72 to the structural headers 62 and 58. It will be seen in FIG. 3 that the fasteners 72 at the left side of the view extend through both of the opposite flanges of the header 62 to prevent the springy coil with its individual row headers from tending to spring open the header 62.

The main portion of the plate 68 which is, for the most part, horizontally disposed has a dimension in a front-to-rear direction, with respect to the depth of the unit, which is about equal to the front-to-rear dimension of the condenser coil. Along a portion of the rear edge of the main plate, it is flanged up as at 74, and along the major portion of the front of the main section of the plate 68 is flanged downwardly as at 76. A motor bracket 78 of generally downwardly open channel shape has its opposite ends 80 and 82 rigidly secured to the plate section 68. The motor bracket 78 includes downwardly directed front flanges 84 and downwardly directed rear flanges 86. The condenser fan motor 54 is mounted on the center portion of the motor bracket, and the two opposite side portions of the motor bracket are provided with a plurality of openings 88 as is best seen in FIG. 4. As is also perhaps best seen in FIG. 4, a vertically disposed rear plate 90 spans the flanges of the motor bracket and the plate means and is secured thereto by means of welding in appropriate locations to provide further rigidity to the assembly of the motor bracket and plate. Additionally, a vertically disposed support 92 lying below the motor and extending from the motor bracket to the plate may be provided to increase the rigidity of this assembly.

From the foregoing description, it should be apparent that a unitary assembly is provided which includes the coil 50, the plate 68, the motor bracket 78, the fan motor 54, and the fan 56 carried thereby. As such, this arrangement is adapted to be installed as a unitary assembly into a container refrigeration unit by simply securing the assembly through a number of fasteners 94 through the flanges 74 and 86, and the back plate 90 into the back wall 49 of the condenser section pocket. The provision of a unitary assembly through the arrangement of this invention is advantageous in the manufacturing process in that the unitary assembly can be made up as a whole and installed more quickly and easily to the container refrigeration unit than if the parts were individually secured into the unit in a different arrangement.

The provision of the main plate 68 having a front-to-rear depth about equal to the depth of the refrigerant coil prevents the flow up into the central space 52 from below, as well as the plate 68, through its securement to the structural headers of the coil, supports the coil and holds it in place. The openings 82 in the motor bracket permit air which has entered the central space through the sides and top of the coil to pass into the space below the motor bracket so that as the fan blades 56 sweep by this area the fan blades continue to function, as distinct from a decreased efficiency if the space below the motor bracket were effectively a dead air space.

We claim:

1. In a transport refrigeration unit of the type having a condenser section having a back wall and containing an inverted U-shaped refrigerant condenser coil, and an electric motor driven propeller fan in said coil to draw condenser air through said coil from the top and sides into the central space in said coil, a coil and motor-fan mounting arrangement comprising:
   structural header means at both of the opposite ends of the legs of said coil;
   plate means extending sideways between said header means and extending in a front-to-rear direction for the front-to-rear depth of said coil;
   means securing the ends of said plate means to said header means;
   a motor bracket rigidly secured at each of its opposite sides to said plate means to form one assembly therewith;
   means securing said one assembly to said back wall of said condenser section;
   said coil, motor-fan, plate means and bracket means comprising a unitary assembly adapted to be installed and removed as such, and with said plate means further functioning to prevent flow up into said central space from below.

2. In a unit according to claim 1 wherein:
   said coil comprises a multi-row coil with each row being separate from the adjacent row; and
   said structural header at the end of one of said legs holds the independent rows thereat in substantially fixed relation to each other.

3. A unit according to claim 1 wherein:
   said motor bracket is of generally downwardly-open channel shape, and includes opening means to permit the flow of air into the space defined between the bracket means and the plate means, from said central space.

4. A unit according to claim 3 wherein:
   both said motor bracket means and said plate means include vertical flange means; and
   said one assembly includes vertically-disposed plate means spanning said flange means and secured thereto.

5. In combination in a transport refrigeration unit having a forwardly-open condenser pocket bounded on its rear by a vertical pocket wall:
   a multi-row refrigerant condenser coil comprised of separate rows of finned tubes, separate from each other throughout the extent of the air flow area, said rows being formed into a downwardly-open, U-shape, a structural header common to and connected to all of said rows at one end of the coil, an individual row header on each coil row at the other end of said coil, a channel-shaped multi-row header with opposing inwardly-directed flanges capturing said individual row headers at said other end to hold said rows in fixed relation to each other at said other end;
   a generally horizontally extending plate secured at opposite ends to said common header and said channel-shaped header;
   a fan motor bracket mounted on said plate;
   a fan motor and a fan carried thereby mounted on said bracket;
   said generally horizontally extending plate having a front-to-rear depth to block air flow to said fan from directly below said coil; and
   means securing said plate and bracket to said vertical pocket wall.

* * * * *